(12) United States Patent
Yang et al.

(10) Patent No.: US 11,495,055 B1
(45) Date of Patent: Nov. 8, 2022

(54) PEDESTRIAN TRAJECTORY PREDICTION METHOD AND SYSTEM BASED ON MULTI-INTERACTION SPATIOTEMPORAL GRAPH NETWORK

(71) Applicant: Huazhong University of Science and Technology, Hubei (CN)

(72) Inventors: You Yang, Hubei (CN); Qian Kan, Hubei (CN); Xinshengzi Huang, Hubei (CN); Qiong Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/835,410

(22) Filed: Jun. 8, 2022

(30) Foreign Application Priority Data

Nov. 10, 2021 (CN) .......................... 202111324614.1

(51) Int. Cl.
| | |
|---|---|
| *G06T 7/246* | (2017.01) |
| *G06Q 10/04* | (2012.01) |
| *G06V 40/20* | (2022.01) |
| *G06V 20/40* | (2022.01) |
| *G06V 10/44* | (2022.01) |
| *G06V 10/42* | (2022.01) |

(52) U.S. Cl.
CPC .............. *G06V 40/20* (2022.01); *G06V 10/42* (2022.01); *G06V 10/457* (2022.01); *G06V 20/46* (2022.01)

(58) Field of Classification Search
CPC ...... G06V 40/20; G06V 10/457; G06V 20/46; G06V 10/42
See application file for complete search history.

(56) References Cited

U.S. PATENT DOCUMENTS

2022/0101155 A1* 3/2022 Beaudoin ................. G06N 3/08

OTHER PUBLICATIONS

Yu et al., "Spatio-Temporal Graph Transformer Networks for Pedestrian Trajectory Prediction", Springer Nature Switzerland AG 2020, pp. 507-523, Oct. 7, 2020.

* cited by examiner

*Primary Examiner* — Michael J Vanchy, Jr.
(74) *Attorney, Agent, or Firm* — Hamre, Schumann, Mueller & Larson, P.C.

(57) ABSTRACT

The present invention discloses a pedestrian trajectory prediction method and system based on a multi-interaction spatio-temporal graph network, which belong to the field of pedestrian trajectory prediction. The method includes: extracting multi-interaction features of pedestrians in video frames; for each frame in a video sequence, abstracting each pedestrian in the frame as a vertex, connecting the pedestrian (s) with other pedestrians to form an edge(s), where the vertex attribute is the multi-interaction feature of the pedestrian so as to obtain a multi-interaction spatio-temporal graph network; for each multi-interaction spatio-temporal graph, obtaining spatial dependencies of each pedestrian with other pedestrians in the spatio-temporal graph, and optimizing the attribute of each vertex through the spatial dependencies between pedestrians; the vertices of adjacent time points of the pedestrians are connected to obtain time dependencies of the pedestrians, and then infer a trajectory of a future time point(s).

7 Claims, 2 Drawing Sheets

PEDESTRIAN TRAJECTORY PREDICTION METHOD AND SYSTEM BASED ON MULTI-INTERACTION SPATIOTEMPORAL GRAPH NETWORK

TECHNICAL FIELD

The present invention relates to the field of pedestrian trajectory prediction, and more particularly, relates to a pedestrian trajectory prediction method and system based on a multi-interaction spatio-temporal graph network.

BACKGROUND ART

Understanding pedestrian behavior in crowds is critical for vision-guided applications such as autonomous driving, smart surveillance systems, and the like. The research on pedestrian trajectory prediction can be traced back to Helbing and Molnar's Social Forces [1]. The manually extracted features proposed in this work simulated the repulsive and attractive effects between pedestrians. Recently, many studies have used deep neural networks to simulate the interaction between pedestrians; the commonly used deep neural networks include RNN, GAN, GNN, Attention Mechanism, and the like. In addition, some studies suggest that the interaction with context plays an important role in the prediction in some complex scenarios. Two key technologies for pedestrian trajectory prediction are: (1) the trajectory is a result of multiple interactions, and various interaction factors should be considered as fully as possible; (2) these interactions need to be modeled in order to take full advantage of the rich interaction information.

The paper "Spatio-temporal graph transformer networks for pedestrian trajectory prediction" proposes a method that uses Transformers to predict pedestrian trajectories. The technical process is shown in FIG. 1, which mainly includes two parts: time Transformer and spatial Transformer. (1) Time Transformer: the input of the time Transformer module is a set of pedestrian trajectory features, and the output thereof is the updated pedestrian trajectory features. The core technique is to use the self-attention mechanism to calculate the query matrix, key matrix and value matrix corresponding to each pedestrian, and then with the multi-head attention mechanism, the attention weight of each pedestrian with time dependence can be calculated, and subsequently the trajectory features of each pedestrian with time dependencies are updated. (2) Spatial Transformer: the main role of the spatial Transformer module is to extract the spatial interactions between pedestrians. The key idea of this module is that the self-attention mechanism can be regarded as the information conveyed in the undirected graph. Therefore, all pedestrians in the same space at the same time constitute a graph. This can use the spatial Transformer to update the trajectory features of each pedestrian with spatial interaction on this graph.

However, the foregoing method still has the following two disadvantages: (1) only the interaction between pedestrians is considered; however, pedestrian trajectories are not only affected by other pedestrians, but also by the context of the environment. For example, pedestrians will avoid obstacles when they encounter obstacles, and avoid cars when they see cars. The interaction between the environment and pedestrians also profoundly affects the surrounding pedestrians. Thus, it lacks the interactive influence of the environment on pedestrians, resulting in low accuracy of pedestrian trajectory prediction in special and complex scenes. (2) The role of Transformer in modeling pedestrian interaction has not been studied deeply enough, and in particular the research on the combination of the Transformer and a graph network in the model needs to be fully conducted. The simulation of the interaction between pedestrians is not accurate enough, which further leads to the low accuracy of pedestrian trajectory prediction.

SUMMARY OF THE INVENTION

In view of the defects and improvement requirements in the existing technologies, the present invention provides a pedestrian trajectory prediction method and system based on a multi-interaction spatio-temporal graph network. The object is to extract features that are more in line with pedestrian walking scenes to improve the accuracy of pedestrian trajectory prediction, especially in complex outdoor scenes.

In order to achieve the above object, according to a first aspect of the present invention, a method for multi-interaction pedestrian feature extraction is provided; for each frame in an input video sequence, the following operations are performed:

extracting a global context feature of the frame through scene segmentation and a convolution operation;

extracting a local context feature of a pedestrian in the frame through gridding and location mapping;

employing an attention mechanism to multiplex the global context feature and the local context feature of the pedestrian to obtain a global-local context feature of the pedestrian in the frame;

extracting a trajectory feature of the pedestrian in the frame; and concatenating the global-local context feature and the trajectory feature of the pedestrian in the frame to obtain a multi-interaction feature of the pedestrian in the frame.

Preferably, the attention mechanism is as follows:

$$c_{t|i} = \text{Sum}(\text{Softmax}(c_{g|t})) + c_{l|t|i}$$

wherein i represents an i-th pedestrian, t represents a t-th video frame, $c_{t|i}$ represents the global-local context feature, $c_{g|t}$ represents the global context feature, $c_{l|t|i}$ represents the local context feature, Softmax( ) represents a Softmax operation, and Sum( ) represents adding up each element.

Beneficial effects: the present invention provides a new attention mechanism. The Softmax operation is used as each local context feature in $c_{g|t}$ to assign an adaptive weight, and compressed global information can be further obtained through the Sum operation. In addition, local information is emphasized through $c_{l|t|i}$. This further improves the accuracy of pedestrian trajectory prediction in some complex scenes (such as scenes where pedestrians and the environment have many interactions).

In order to achieve the above object, according to a second aspect of the present invention, a method for pedestrian trajectory prediction based on a multi-interaction spatio-temporal graph network is provided; the method comprises:

S1. employing the method set forth in the first aspect to extract a multi-interaction feature of pedestrians in video frames;

S2. for each frame in a video sequence, abstracting each pedestrian in the frame as a vertex, connecting the pedestrians with other pedestrians in a scene to form edges, a vertex attribute being the multi-interaction feature corresponding to the pedestrian so as to obtain a multi-interaction spatio-temporal graph network;

S3. for each multi-interaction spatio-temporal graph, obtaining spatial dependencies of each pedestrian with other pedestrians in the spatio-temporal graph, and optimizing the attribute of each vertex based on the spatial dependencies between pedestrians; and S4. connecting vertices of the same pedestrian at adjacent time points to obtain time dependencies of each pedestrian so as to infer a trajectory thereof at a future time point.

Preferably, in step S3, Graph Convolutional Network (GCN) is used to measure interaction weights between pedestrians, and in the GCN, a weight adjacency matrix $A_t$ of a spatial graph is as shown below:

$$a_{t|ij} = \begin{cases} 1/\|d_{t|i} - d_{t|j}\|_2, & i \neq j \\ 0, & i = j, \end{cases}$$

wherein t represents a time point, i,j represents pedestrian serial numbers, $\|d_{t|i} - d_{t|j}\|_2$ represents a Euclidean distance between pedestrians i and j; and vertex features are optimized and aggregated by the GCN:

$$\mathcal{F}(M_t) = \sigma\left(\Lambda_t^{-\frac{1}{2}}(A_t + I)\Lambda_t^{-\frac{1}{2}} M_t W_{GCN}\right)$$

wherein $\Lambda_t$ represents a vertex degree matrix of $A_t+I$, I represents an identity matrix, $$\Lambda_t^{-\frac{1}{2}}(A_t + I)\Lambda_t^{-\frac{1}{2}}$$

represents a normalized Laplacian matrix, $W_{GCN}$ represents a weight matrix of a learned linear transformation, $\sigma(\ )$ represents an activation function, $\mathcal{F}(\ )$ represents a GCN process, and $M_t$ represents multi-interaction features of all pedestrians in the t-th frame.

Beneficial effects: to address the optimization problem of the existing space dimension pedestrian interaction weight, the present invention completes the optimization process through GCN. The adjacency matrix of GCN is calculated based on the distance(s) between pedestrians, and the distance(s) between pedestrians directly affects the strength of the interaction(s) between pedestrians. Therefore, the interaction weight(s) between pedestrians can be more accurately measured.

Preferably, after the GCN, Transformers are connected in series, and a self-attention mechanism of the Transformers is as follows:

$$\mathcal{T}^n(M_{t|i}) = \frac{\text{Softmax}\left((q_{t|i}^n)^T k_{t|i}^n\right)}{d_k^{1/2}} (l_{t|j}^n)^T + M_{t|i}$$

wherein $q_{t|i}^n$ represents a query vector, $k_{t|i}^n$ represents a key vector, $d_k$ is a dimension of each query, $l_{t|j}^n$ represents a value vector, n represents an attention head sequence number, $\mathcal{T}^n(\ )$ represents a self-attention mechanism process of the Transformers, $M_{t|i}$ represents multiple interaction features; and a multi-head attention mechanism is used to capture richer information through different aspects:

$$\mathcal{M}(M_{t|i}) = \text{Concat}_{n=1,2,\ldots,N}(\mathcal{T}^n(M_{t|i}))$$

wherein N represents a number of heads of attention, $\mathcal{M}(\ )$ represents a multi-head attention mechanism process, and $\text{Concat}_{n=1,2,\ldots,N}$ represents the concatenation operation.

Beneficial effects: to address the problem of low global information transfer efficiency in the existing optimization method based on the graph structure, the present invention combines Transformers on the basis of GCN. The Transformer self-attention mechanism is suitable for transferring information between vertices, and its long distance property makes it possible to effectively utilize global information from shallow layers to deep layers. As a result, the Transformer and GCN are combined to optimize the interaction weights between pedestrians, transmit global information more effectively, capture more information, and deeply mine the interactions between pedestrians, thereby improving the accuracy of pedestrian trajectory prediction.

In order to achieve the above object, according to a third aspect of the present invention, a system for pedestrian trajectory prediction based on a multi-interaction spatio-temporal graph network is provided; the system comprises: a computer-readable storage medium, and a processor;

the computer-readable storage medium is configured to store executable instructions; and the processor is configured to read the executable instructions stored in the computer-readable storage medium, and execute the pedestrian trajectory prediction method based on the multi-interaction spatio-temporal graph network according to the second aspect.

In order to achieve the above object, according to a fourth aspect of the present invention, a computer-readable storage medium is provided; the storage medium comprises a stored computer program; when the computer program is executed by the processor, the device where the computer-readable storage medium is located is controlled to execute the method for extracting multiple interactive pedestrian features according to the first aspect, or the pedestrian trajectory prediction method based on the multi-interaction spatio-temporal graph network according to the second aspect.

In general, through the above technical solutions provided by the present invention, the following beneficial effects can be achieved:

(1) In the existing technologies, usually the trajectory features alone are used as the pedestrian features, resulting in the inability to predict pedestrian trajectories very accurately in some complex scenes. The present invention proposes a new pedestrian trajectory feature extraction method, in which global-local context features are introduced, in which the global context feature reflects/represents the interaction effect of the entire scene where the pedestrians are located on the pedestrians, the local context features reflect/represent the interaction effect of the scene on the pedestrians, the local and global context features are combined through the attention mechanism, which are further combined with the trajectory features, and the multi-interaction features of pedestrians are therefore obtained. Since the global-local context feature includes the interaction between pedestrians and the environment, it improves the accuracy of pedestrian trajectory prediction in some complex scenes (such as scenes in which pedestrians and the environment have many interactions).

(2) The trajectory of a pedestrian is not only affected by other pedestrians, but also by the environmental context. For example, pedestrians will avoid obstacles when they encounter obstacles, and avoid cars when they see cars. The interaction between the environment and pedestrians also profoundly affects the surrounding pedestrians. However, the existing pedestrian trajectory prediction methods only consider the interactive relationship between pedestrians, but do not consider the interactive influence of the environment on pedestrians. This leads to low accuracy of pedestrian trajectory prediction in certain complex scenes. The present invention proposes a new pedestrian trajectory prediction method. It simulates the interaction between pedestrian and environmental context by extracting multi-interaction pedestrian features as vertex attributes. In addition, it considers the interaction between pedestrians in the spatial dimension and the interaction of the pedestrians themselves in the time dimension, thereby improving the accuracy of pedestrian trajectory prediction in some complex scenes.

DETAILED DESCRIPTION

To make the objects, technical solutions and advantages of the present invention clear, the present invention will be further described in detail below with reference to the accompanying drawings and embodiments. It should be understood that the specific embodiments described herein are only used to explain the present invention, but not to limit the present invention. In addition, the technical features involved in the various embodiments of the present invention as described below can be combined with each other as long as there is no conflict with each other.

Figure 1:
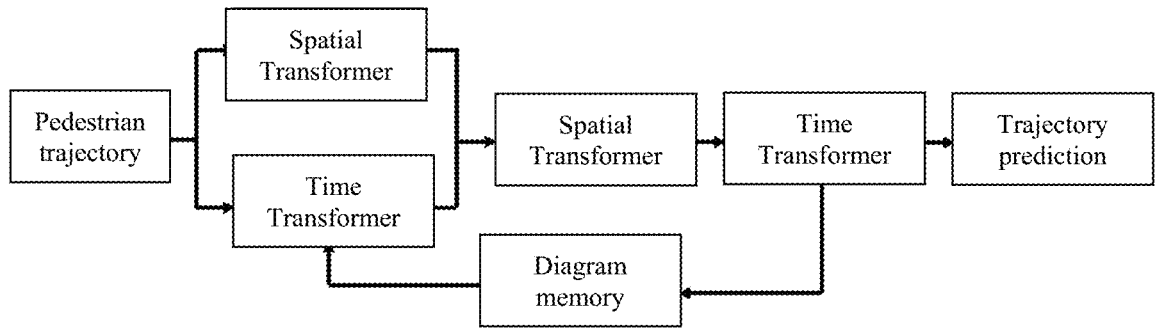
FIG. 1 is a flowchart of a method for predicting pedestrian trajectory using a Transformer in the existing technologies.
Figure 2:
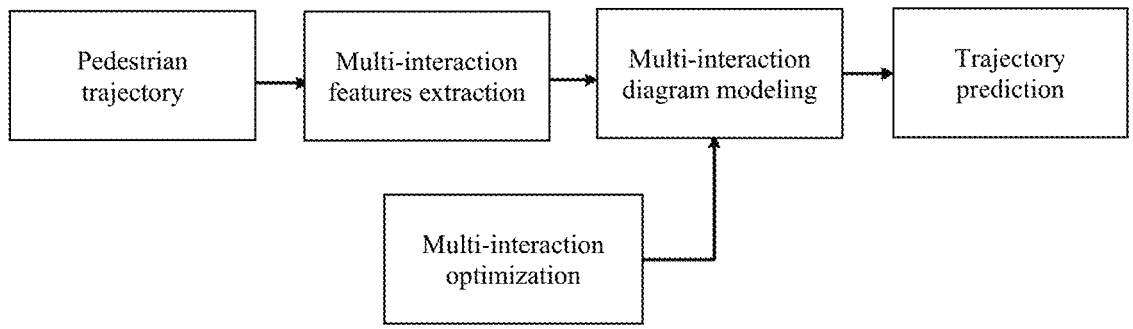
FIG. 2 is a flowchart of a pedestrian trajectory prediction method based on a multi-interaction spatio-temporal graph network provided by the present invention.

The present invention provides a pedestrian trajectory prediction method based on a multi-interaction spatio-temporal graph network. As shown in FIG. 2, the method can be divided into three parts: multi-interaction feature extraction, multi-interaction graph modeling, and multi-interaction optimization, which will be described in detail below. It is assumed that there are X pedestrians in an observed video sequence of a length $T_{obs}$; the goal of the present invention is to predict the trajectory coordinates of these X pedestrians in a sequence of length $T_{pred}$ in the future.

(1) Multi-Interaction Feature Extraction

In the existing technologies, either local context information alone or only global context information alone is used. Without global context, some important information far from pedestrians may be lost. For example, in the case where a pedestrian wants to take a bus that is in the distance, the location of the bus plays a key role in trajectory prediction. On the other hand, without local context information, it would be difficult to clearly model interactions with surrounding scenes and objects. For example, a pedestrian needs to go around an obstacle in front of him.

Figure 3:
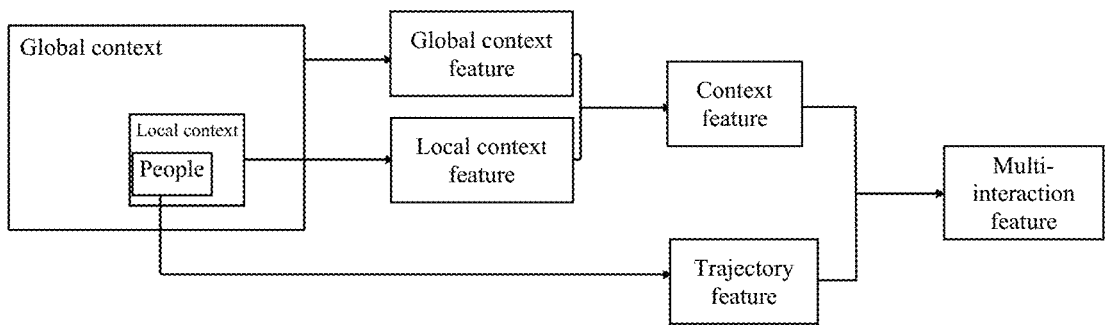
FIG. 3 is a schematic graph of a multi-interaction feature extraction process provided by the present invention.

The present invention proposes a new feature extraction method. As shown in FIG. 3, both local and global context information are first extracted and then combined through an attention mechanism. In this way, both the global context with rich global information and the local context with key local information around a particular pedestrian are involved in capturing the interaction with the context. In addition, trajectory features are also extracted from videos. The trajectory features and context information features are combined to jointly represent multi- interaction features.

To extract global context information, the present invention uses a pre-trained scene segmentation model to extract scene feature graph(s) of a video frame, and then crop them through convolution operations. In this way, context features around specific pedestrians can be easily extracted. At the same time, the global context can be compressed without losing key information. After these steps, the present invention obtains the global context feature $c_{g|t}$.

To extract the local context feature $c_{l|t|i}$ of each pedestrian in a video frame, the present invention establishes a connection between each pedestrian and a pixel grid. For example, the original video frame can be divided into P×P grids, and the global context features can also be divided into P×P grids. If a pedestrian belongs to the grid with the position of (1,1) after the original video frame is divided, then its local context feature is represented by the grid feature with the global context feature position of (1,1). In this way, the present invention can easily obtain local context features, which are closely related to the global context features, and contain rich context information about the surrounding scene related to the pedestrian.

After acquiring the global and local contextual features, the present invention further proposes an attention mechanism. It not only emphasizes local information, but also fully considers global information. First of all, the present invention utilizes the Softmax operation to optimize the weight of each grid in $c_{g|t}$. Accordingly, each grid is adaptively assigned a weight that measures the impact on a particular pedestrian. Second, the present invention further compresses the global context information by means of summing the optimized features of each grid. Third, the present invention adds up $c_{l|t|i}$ and the processed $c_{g|t}$ to obtain the global-local context feature $C_{t|i}$. This step combines global and local information together in a compact and efficient way. In addition, the local context feature weights are further enhanced, as the global context also contains the local context. The definition of the attention mechanism is shown in formula (1) below:

$$C_{t|i} = \text{Sum}(\text{Softmax}(c_{g|t})) + c_{l|t|i} \qquad (1)$$

where Softmax( ) represents the Softmax operation, and Sum( ) represents adding up each element.

(2) Multi-Interaction Graph Modeling

After obtaining the features containing contextual interaction information, multiple interactions can be modeled using a spatio-temporal graph(s). This module will be described in three parts: graph construction, spatial aggregation mechanism, and temporal aggregation mechanism.

(i) Graph Construction

The interaction of the pedestrians and the context in the present invention is embodied in the construction of a graph(s). The construction of the graph(s) can be divided into three parts: the properties of vertices and edges, the connectivity of the graph(s), and the features of vertices.

First, graphs are connected in both time and space dimensions. This can be expressed as $G = \{G_t | t \in \{1, \ldots, T_{obs}\}\}$, where $G_t$ represents the spatial graph of the t-th frame, $G_t$ is defined as $G_t = (V_t, E_t)$, and $V_t$ represents a set of the vertices in the t-th frame, and $E_t$ represents a set of edges in the t-th frame. In addition, $V_t = \{v_{t|i} | i \in \{1, \ldots, X\}\}$.

Second, in the spatial dimension, the present invention adopts a fully connected manner, and all pedestrians are connected with other pedestrians in the scene. In addition, the vertices of the same pedestrian at adjacent time points in the time dimension are also connected.

Third, in order to introduce the interactions between context information into the method of the present invention, the present invention combines the trajectory feature and the context interaction feature as a vertex feature. In this way, interactions with context can be obtained in an efficient and simple way and incorporated into a graph network structure, thereby facilitating subsequent aggregation and prediction.

(ii) Spatial Aggregation Mechanism

In the spatial dimension, the present invention uses GCN to measure the interaction weight(s) between pedestrians. Specifically, in GCN, the Euclidean distance between pedestrians i and j is used to compute the adjacency matrix of the spatial graph. The weight adjacency matrix $A_t$ is defined in formula (2) below:

$$a_{t|ij} = \begin{cases} 1/\|d_{t|i} - d_{t|j}\|_2, & i \neq j \\ 0, & i = j, \end{cases} \quad (2)$$

where t represents the time, i,j represent the pedestrian serial numbers, and $\|d_{t|i} - d_{t|j}\|_2$ represents the Euclidean distance between the pedestrians i and j.

Next, the vertex features are optimized and aggregated by GCN, as shown in formula (3) below:

$$\mathcal{F}(M_t) = \sigma\left(\Lambda_t^{-\frac{1}{2}}(A_t + I)\Lambda_t^{-\frac{1}{2}} M_t W_{GCN}\right) \quad (3)$$

where $\Lambda_t$ represents the vertex degree matrix of $A_t + I$, I represents an identity matrix, $$\Lambda_t^{-\frac{1}{2}}(A_t + I)\Lambda_t^{-\frac{1}{2}}$$

represents a normalized Laplacian matrix, $W_{GCN}$ represents a weight matrix of the learned linear transformation, $\sigma(\ )$ represents an activation function, $\mathcal{F}(\ )$ represents a GCN process, and $M_t$ represents multi-interaction features of all pedestrians in the t-th frame.

(iii) Time Aggregation Mechanism

After obtaining the aggregated compact features including context interactions and interactions with other pedestrians in the spatial dimension, the temporal interaction should also be considered. This also corresponds to the interaction with the pedestrian himself or herself, since the future trajectory of a pedestrian will be profoundly affected by the past trajectory of the pedestrian. The graph in the time dimension connects the vertices of the same pedestrian at different time points. Next, operations such as causal convolution, weighted normalization, activation function, dropout, and residual connection (improved CNN) are used to update pedestrian vertices, and the updated vertex features include interactions with the pedestrian's past trajectory. In addition, the time aggregation mechanism also obtains a Gaussian distribution of future trajectories, which facilitates prediction of possible trajectories of future diversity.

The improved CNN includes the following layers in series: the first layer is used to reduce the dimension of each vertex to 5 dimensions, representing the X/Y mean, X/Y standard deviation and correlation coefficient of the predicted trajectory respectively; the second layer is used to change the length of the observed video frame sequence into the sequence length to be predicted; each layer of the third to fifth layers includes operations such as causal convolution, weighted normalization, activation functions, and residual connections to obtain temporal interaction-dependent features of the pedestrian.

On the basis of the X/Y mean, X/Y standard deviation and correlation coefficient of the predicted trajectory, the final predicted trajectory coordinates can be obtained.

(3) Multi-Interaction Optimization

The pedestrian vertex features obtained through the above graph modeling can handle some typical and general scenes. However, the existing graph structure-based optimization methods still have room for improvement due to the low efficiency of global information transfer. First, the interactions between pedestrians are complex and cannot be measured by distance as a factor alone. Second, the graph model has limitations in transmitting global information. Third, GCNs have shortcomings in pooling multimodal features. Therefore, an attention mechanism is needed to better model these factors. In addition, it should fully adapt to the graph structure.

Figure 4:
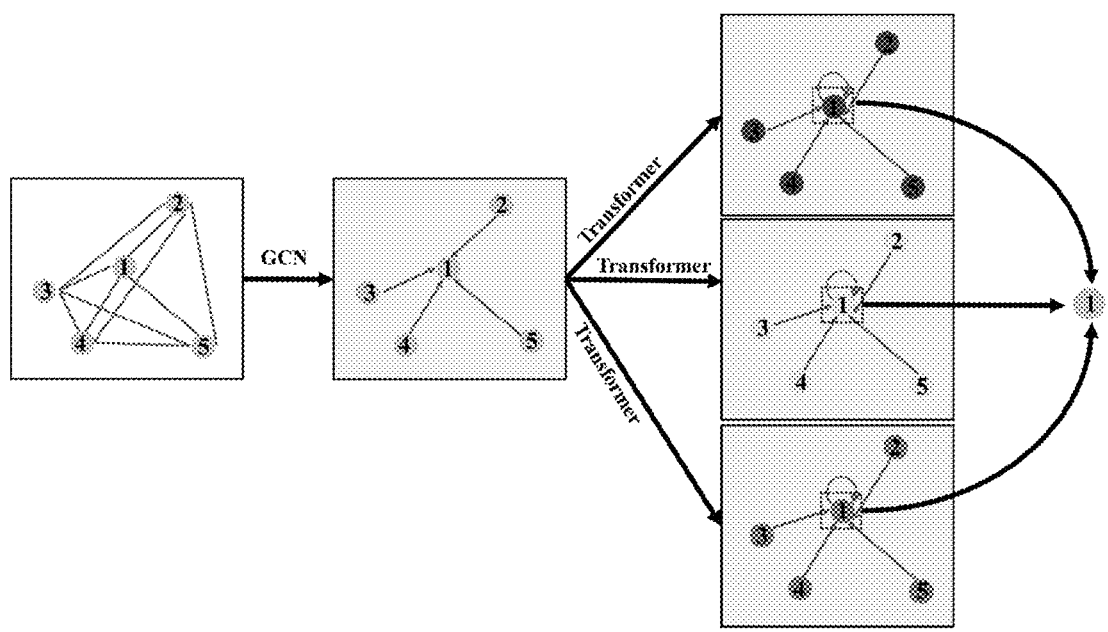
FIG. 4 is a schematic graph of a multi-interaction optimization process provided by the present invention, where the dots represent pedestrians, and the lines between the dots represent a process of updating and optimizing vertex features.

In the present invention, the Transformer and GCN are combined in a new way different from that in the existing technologies for further optimization. The present invention also needs to consider how to adopt the Transformer into the spatial dimension and how to adapt to the graph structure. First, the self-attention mechanism is suitable for transferring information between vertices. Second, compared to CNNs with limited receptive fields, the long-distance property of the Transformer makes it possible to efficiently utilize global information from shallow layers to deep layers. FIG. 4 shows the process of multi-interaction optimization.

For illustration, the present invention only describes the optimization process of one vertex. Based on the above considerations, for $M_{t|i}$, its query vector, key vector, and value vector are correspondingly marked as $q_{t|i}$, $k_{t|i}$ and $l_{t|i}$. The Transformer's self-attention mechanism is shown in formula (4) below:

$$\mathcal{T}^n(M_{t|i}) = \frac{\text{Softmax}\left((q_{t|i}^n)^T k_{t|j}^n\right)}{d_k^{1/2}} (l_{t|j}^n)^T + M_{t|i} \quad (4)$$

where $q_{t|i}^n$ represents the query vector, $k_{t|i}^n$ represents the key vector, $d_k$ is the dimension of each query, $l_{t|j}^n$ represents the value vector, n represents an attention head sequence number, $\mathcal{T}^n(\ )$ represents a self-attention mechanism process of the Transformer, and $M_{t|i}$ represents multiple interaction features;

$$\mathcal{M}(M_{t|i}) = \text{Concat}_{n=1,2,\ldots,N}(\mathcal{T}^n(M_{t|i})) \quad (5)$$

where N represents the number of heads of attention, $\mathcal{M}(\ )$ represents a multi-head attention mechanism process, and $\text{Concat}_{n=1,2,\ldots,N}$ represents a concatenation operation.

Of course, in the multi-interaction optimization module, the way of combining GCN and the Transformer can also be that the Transformer updates the weights first, and then GCN updates the weights.

After spatial aggregation and time aggregation, the attributes of the vertices are updated. Training samples are used for training. In this embodiment, the training samples are 8 adjacent video frames, and the corresponding labels are the trajectories of pedestrians in 12 consecutive frames after the observed video frames. After the training is completed, the trajectory prediction can be performed using the observed 8 video frames.

A person skilled in the art can easily understand that the above descriptions are only some preferred embodiments of the present invention, and are not intended to limit the present invention. Any modifications, equivalent replacements and improvements made within the spirit and principles of the present invention shall fall within the scope of protection of the present invention.

The invention claimed is:

1. A method for multi-interaction pedestrian feature extraction, wherein for each frame in an input video sequence, the following operations are performed:

extracting a global context feature of the frame through scene segmentation and a convolution operation;

extracting a local context feature of a pedestrian in the frame through gridding and location mapping;

employing an attention mechanism to fuse the global context feature and the local context feature of the pedestrian to obtain a global-local context feature of the pedestrian in the frame;

extracting a trajectory feature of the pedestrian in the frame; and concatenating the global-local context feature and the trajectory feature of the pedestrian in the frame to obtain a multi-interaction feature of the pedestrian in the frame.

wherein the attention mechanism is as follows:

$$C_{tli} = \text{Sum}(\text{Softmax}(c_{glt})) + c_{ltli}$$

wherein i represents an i-th pedestrian, t represents a t-th video frame, $c_{tli}$ represents the global-local context feature, $c_{glt}$ represents the global context feature, $c_{lltli}$ represents the local context feature, Softmax( ) represents a Softmax operation, and Sum( ) represents adding up each element.

2. A method for pedestrian trajectory prediction based on a multi-interaction spatio-temporal graph network, wherein the method comprises:

S1: employing the method set forth in claim 1 to extract a multi-interaction feature of pedestrians in video frames;

S2: for each frame in a video sequence, abstracting each pedestrian in the frame as a vertex, connecting the pedestrians with other pedestrians in a scene to form edges, a vertex attribute being the multi-interaction feature corresponding to the pedestrian so as to obtain a multi-interaction spatio-temporal graph network;

S3: for each multi-interaction spatio-temporal graph, obtaining spatial dependencies of each pedestrian with other pedestrians in the spatio-temporal graph, and optimizing the attribute of each vertex based on the spatial dependencies between pedestrians; and S4: connecting vertices of the same pedestrian at adjacent time points to obtain time dependencies of each pedestrian so as to infer a trajectory thereof at a future time point.

3. The method according to claim 2, wherein in step S3, GCN is used to measure interaction weights between pedestrians, and in the GCN, a weight adjacency matrix $A_t$ of a spatial graph is as shown below:

$$a_{tij} = \begin{cases} 1/\|d_{tli} - d_{tlj}\|_2, & i \neq j \\ 0, & i = j, \end{cases}$$

wherein t represents a time point, i,j represents pedestrian serial numbers, $\|d_{tli} - d_{tlj}\|_2$ represents a Euclidean distance between pedestrians i and j; and vertex features are optimized and aggregated by the GCN:

$$\mathcal{F}(M_t) = \sigma\left(\Lambda_t^{-\frac{1}{2}}(A_t + I)\Lambda_t^{-\frac{1}{2}} M_t W_{GCN}\right)$$

wherein $\Lambda_t$ represents a vertex degree matrix of $A_t + I$, I represents an identity matrix, $$\Lambda_t^{-\frac{1}{2}}(A_t + I)\Lambda_t^{-\frac{1}{2}}$$

represents a normalized Laplacian matrix, $W_{GCN}$ represents a weight matrix of a learned linear transformation, $\sigma( )$ represents an activation function, $\mathcal{F}( )$ represents a GCN process, and $M_t$ represents multi-interaction features of all pedestrians in the t-th frame.

4. The method according to claim 3, wherein after the GCN, Transformers are connected in series, and a self-attention mechanism of the Transformers is as follows:

$$\mathcal{T}^n(M_{tli}) = \frac{\text{Softmax}((q_{tli}^n)^T k_{tli}^n)}{d_k^{1/2}}(l_{tlj}^n)^T + M_{tli}$$

wherein $g_{tli}^n$ represents a query vector, $k_{tli}^n$ represents a key vector, $d_k$ is a dimension of each query, $l_{tlj}^n$ represents a value vector, n represents an attention head sequence number, $\mathcal{T}^n( )$ represents a self-attention mechanism process of the Transformers, $M_{tli}$ represents multiple interaction features; and a multi-head attention mechanism is used to capture richer information through different aspects:

$$\mathcal{M}(M_{tli}) = \text{Concat}_{n=1,2,\ldots,N} \mathcal{T}^n(M_{tli}))$$

wherein N represents a number of heads of attention, $\mathcal{M}( )$ represents a multi-head attention mechanism process, and $\text{Concat}_{n=1,2,\ldots,N}$ represents the concatenation operation.

5. A system for pedestrian trajectory prediction based on a multi-interaction spatio-temporal graph network, the system comprises: a computer-readable storage medium, and a processor;

the computer-readable storage medium is configured to store executable instructions; and the processor is configured to read the executable instructions stored in the computer-readable storage medium, and execute the pedestrian trajectory prediction method based on the multi-interaction spatio-temporal graph network according to claim 2.

6. A non-transitory computer-readable storage medium, wherein the non-transitory computer-readable storage medium comprises a stored computer program; when the computer program is executed by a processor, a device where the non-transitory computer-readable storage medium is located is controlled to execute the method for pedestrian trajectory prediction based on the multi-interaction spatio-temporal graph network according to claim 2.

7. A non-transitory computer-readable storage medium, wherein the non-transitory computer-readable storage medium comprises a stored computer program; when the computer program is executed by a processor, a device where the non-transitory computer-readable storage medium is located is controlled to execute the method for extracting multiple interactive pedestrian features according to claim 1.

\* \* \* \* \*